United States Patent
Wu et al.

(10) Patent No.: US 11,523,174 B2
(45) Date of Patent: Dec. 6, 2022

(54) BITSTREAM PROCESSING METHOD AND DEVICE

(71) Applicant: ZTE CORPORATION, Guangdong (CN)

(72) Inventors: Zhao Wu, Guangdong (CN); Ming Li, Guangdong (CN); Ping Wu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 154 days.

(21) Appl. No.: 16/975,763

(22) PCT Filed: Feb. 22, 2019

(86) PCT No.: PCT/CN2019/075802
§ 371 (c)(1),
(2) Date: Aug. 26, 2020

(87) PCT Pub. No.: WO2019/165933
PCT Pub. Date: Sep. 6, 2019

(65) Prior Publication Data
US 2020/0404369 A1    Dec. 24, 2020

(30) Foreign Application Priority Data
Feb. 27, 2018  (CN) .................. 201810162825.1

(51) Int. Cl.
*H04N 21/40*    (2011.01)
*H04N 21/20*    (2011.01)
(Continued)

(52) U.S. Cl.
CPC ..... *H04N 21/440218* (2013.01); *H04N 19/40* (2014.11); *H04N 19/46* (2014.11)

(58) Field of Classification Search
CPC ...................................................... H04N 21/20
See application file for complete search history.

(56) References Cited

U.S. PATENT DOCUMENTS 7,376,159 B1 * 5/2008 Stanger .............. H04N 21/4348
370/537
2003/0022974 A1  1/2003 Tai et al.
(Continued)

FOREIGN PATENT DOCUMENTS

| CN | 1294820 A | 5/2001 |
|---|---|---|
| CN | 1798340 A | 7/2006 |

(Continued)

OTHER PUBLICATIONS

Search Report for the Chinese Application No. 2018101628251, dated Feb. 20, 2021, 3 pages.
(Continued)

*Primary Examiner* — Mushfikh I Alam
(74) *Attorney, Agent, or Firm* — KDB Firm PLLC (57) ABSTRACT

Provided is a bitstream processing method, including: acquiring auxiliary information in a bitstream, where the auxiliary information includes at least one of bitstream information for transcoding or bitstream information for supporting transcoding; and transcoding the bitstream by using the auxiliary information and generating a transcoded bitstream. Further provided are a bitstream processing device and a storage medium.

20 Claims, 1 Drawing Sheet

110 — Acquire auxiliary information in a bitstream, where the auxiliary information includes at least one of bitstream information usable for transcoding or bitstream information for supporting transcoding 120 — Transcode the bitstream by using the auxiliary information and generate a transcoded bitstream (51) Int. Cl.
*H04N 21/4402* (2011.01)
*H04N 19/40* (2014.01)
*H04N 19/46* (2014.01)

(56) References Cited

U.S. PATENT DOCUMENTS

| | | | |
|---|---|---|---|
| 2007/0206873 A1 | 9/2007 | Schwenke et al. | |
| 2008/0123741 A1 | 5/2008 | Li et al. | |
| 2008/0175325 A1 | 7/2008 | Hannuksela et al. | |
| 2011/0150073 A1 | 6/2011 | Luthra | |
| 2012/0257672 A1 | 10/2012 | Yang et al. | |
| 2013/0028325 A1* | 1/2013 | Le Floch | H04N 19/46 375/240.16 |
| 2013/0039424 A1* | 2/2013 | Le Floch | H04N 19/895 375/240.16 |
| 2015/0372820 A1* | 12/2015 | Schneider | H04N 21/2355 380/42 |
| 2016/0227233 A1* | 8/2016 | Cho | H04N 19/44 |
| 2018/0027278 A1* | 1/2018 | Yang | H04N 21/8352 725/131 |
| 2019/0141318 A1* | 5/2019 | Li | H04N 19/563 |
| 2020/0275171 A1* | 8/2020 | Cloud | H04N 21/64738 |
| 2022/0166991 A1* | 5/2022 | Atkins | H04N 19/30 |

FOREIGN PATENT DOCUMENTS

| | | |
|---|---|---|
| CN | 101193290 A | 6/2008 |
| CN | 102014284 A | 4/2011 |
| CN | 102036061 A | 4/2011 |
| CN | 102625150 A | 8/2012 |
| CN | 104641651 A | 5/2015 |
| CN | 105898448 A | 8/2016 |
| CN | 107333148 A | 11/2017 |
| EP | 0942605 A2 | 9/1999 |
| EP | 0942605 A3 | 8/2005 |
| FR | 2933837 A1 | 1/2010 |
| JP | 2000299857 A | 10/2000 |
| JP | 2001069936 A | 3/2001 |
| JP | 2002044622 A | 2/2002 |
| KR | 20160035096 A | 3/2016 |
| WO | 0169936 A2 | 9/2001 |
| WO | 0169936 A3 | 9/2001 |
| WO | 2016209125 A1 | 12/2016 |

OTHER PUBLICATIONS

Office Action for the Chinese Application No. 2018101628251, dated Feb. 20, 2021, 5 pages.
Lujun et al., "MPEG Video Transcoding with Adaptive Drifting Error Control" Journal of Computer Research and Development, 43(1):109-114, 2006.
The Second Office Action for CN 201810162825.1, dated Aug. 31, 2021.
Supplemental Search Report for for CN 201810162825.1, dated Aug. 31, 2021.
Notification of Reason for Refusal for KR 10-2020-7027795 dated Sep. 24, 2021.
Notice of Reasons for Refusal for JP 2020-545156, dated Jul. 20, 2021.
International Search Report for the International Patent Application No. PCT/CN2019/075802, dated Apr. 16, 2019, 2 pages.
Sullivan et al., "Overview of the High Efficiency Video Coding (HEVC) Standard", IEEE Transactions on Circuits and Systems for Video Technology, Jan. 1, 2012 (Jan. 1, 2012), pp. 1-9.
"Requirments for a Future Video Coding Standard v1", 112. MPEG Meeting, Jun. 22, 2015-Jun. 26, 2015; Warsaw; (Motion Picture Expert Group or ISO/IEC JTC1/SC29/WG11).
Supplemental European Search Report dated Jan. 7, 2022, for EP 19763090.5.

* cited by examiner

BITSTREAM PROCESSING METHOD AND DEVICE

CROSS-REFERENCE TO RELATED APPLICATIONS

This is a National Stage Application, filed under 35 U.S.C. 371, of International Patent Application No. PCT/CN2019/075802, filed on Feb. 22, 2019, which claims priority to Chinese patent application No. 201810162825.1 filed on Feb. 27, 2018, contents of both of which are incorporated herein by reference in their entireties.

TECHNICAL FIELD

Embodiments of the present disclosure relate to the field of multimedia technologies, for example, to a bitstream processing method and device.

BACKGROUND

With the development of multimedia services, multimedia is widely used in different fields, such as digital broadcasting, network media, mobile media and the like. In a heterogeneous network, a high-efficiency media data distribution strategy needs to be used for massive media data, so as to adapt to terminal apparatuses with different format input requirements, thus satisfying requirements of users.

There are two schemes in the related art, one is to store multiple bitstreams, and the other is to transcode in real time. For the method of storing multiple bitstreams, since in this scheme the storage space is occupied, when there are too many bitstreams to be stored, it is likely to cause insufficient storage space. The method of transcoding in real time includes decoding the bitstreams and then re-encoding according to the requirements. Using this method in an implementation process is equivalent to perform one complete decoding and one complete encoding, therefore, this method has a large calculation amount, occupies more resources and has a low transcoding efficiency.

SUMMARY

The present disclosure provides a bitstream processing method and device, which can improve the transcoding efficiency.

In one embodiment, the present disclosure provides a bitstream processing method, including steps described below.

Auxiliary information in a bitstream is acquired. The auxiliary information includes at least one of bitstream information for transcoding or bitstream information for supporting transcoding.

The bitstream is transcoded by using the auxiliary information and a transcoded bitstream is generated.

The present disclosure further provides a bitstream processing device, including an acquisition module and a processing module.

The acquisition module is configured to acquire auxiliary information in a bitstream; where the auxiliary information includes at least one of bitstream information for transcoding or bitstream information for supporting transcoding.

The processing module is configured to transcode the bitstream by using the auxiliary information and generate a transcoded bitstream.

In one embodiment, the present disclosure further provides a bitstream processing device including a memory and a processor, the memory is configured to store an instruction which, when executed by the processor, implements the method of any one of the above-mentioned embodiments.

In one embodiment, the present disclosure further provides a computer-readable storage medium configured to store a computer-executable instruction which, when executed, implements the method of any one of the above-mentioned embodiments.

BRIEF DESCRIPTION OF DRAWINGS

The drawings are used to provide an understanding of the technical schemes of the present disclosure, which constitute a part of the specification to explain the technical schemes of the present disclosure in conjunction with the embodiments of the present disclosure, and do not limit the technical schemes of the present disclosure.

DETAILED DESCRIPTION

The embodiments described herein and the features thereof can be combined with each other without collision.

The steps illustrated in the flowcharts among the drawings may be performed by a computer system such as a group of computers capable of executing instructions. Moreover, although logical sequences are illustrated in the flowcharts, the illustrated or described steps may be performed in sequences different from those described herein in some cases.

Figure 1:
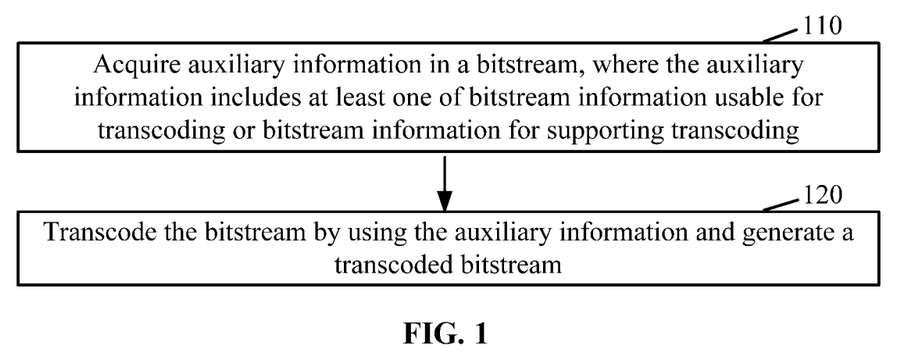
FIG. 1 is a flowchart of a bitstream processing method according to an embodiment of the present disclosure.

The embodiments of the present disclosure provide a bitstream processing method. As shown in FIG. 1, the method includes step 110 and step 120.

In step 110, auxiliary information in a bitstream is acquired.

The auxiliary information includes at least one of bitstream information for transcoding or bitstream information for supporting transcoding.

In one embodiment, the bitstream information for transcoding includes at least one of: an encoding type of the bitstream, an encoding capability level of the bitstream, a code rate of the bitstream, a frame rate of the bitstream, an image resolution of the bitstream, a color space of the bitstream, a luminance and chrominance sampling format of the bitstream, a dynamic range of the bitstream, encoding information of the bitstream or user-defined information of the bitstream. The encoding information of the bitstream includes partitioning information of the bitstream; or, the encoding information of the bitstream includes partitioning information of the bitstream, a bitstream residual and at least one of mode selection information of the bitstream, motion estimation information of the bitstream or quantization information of the bitstream. The bitstream residual includes a residual for the transcoded bitstream, or a difference value between a residual for the bitstream and a residual for the transcoded bitstream.

In one embodiment, the bitstream information for supporting transcoding includes at least one of: an encoding type of the transcoded bitstream, an encoding capability level of the transcoded bitstream, a code rate of the transcoded bitstream, a frame rate of the transcoded bitstream, an image resolution of the transcoded bitstream, a color space of the transcoded bitstream, a luminance and chrominance sampling format of the transcoded bitstream, a dynamic range of the transcoded bitstream or user-defined information of the transcoded bitstream.

In one embodiment, the encoding type refers to a video standard to which the bitstream conforms. The video standard may be a high efficiency video coding standard (HEVC) (also referred to as H.265), an advanced video coding standard (AVC) (also referred to as H.264), a network video image compression standard (Moving Picture Experts Group (MPEG-4)), a low bit rate video coding standard (H.263), a video image compression standard MPEG-2 of a digital video disc (DVD)/super video compact disc (VCD), a video compression standard (next gen open video (VP9)) developed by Google and with an open format and no licensing fee, a streaming media format standard (windows media video (WMV)) launched by Microsoft and the like. The capability level refers to a capability level that a decoder should have when correctly decoding the bitstream. The code rate may be 2 Mbps, 10 Mbps or the like. The frame rate may be 25 fps, 30 fps and the like. The image resolution may be 720p, 1080p and the like. The color space may be a color standard of luminance, chrominance, and chroma (YUV), or a color standard of red-green-blue (RGB) or the like. The luminance and chrominance sampling format may be a YUV444, a YUV420 and the like. The dynamic range may be a standard dynamic range (SDR), a high-dynamic range (HDR) image, or the like.

In step 120, the bitstream is transcoded by using the auxiliary information and a transcoded bitstream is generated.

In an embodiment, when the auxiliary information is the encoding type of the bitstream, a target encoding type that may be supported by the encoding type of the bitstream is acquired. If an encoding type requested by a receiving end is the same as the encoding type of the bitstream or is contained in the target encoding type, a transcoding operation is performed on the bitstream and the transcoded bitstream is generated. When the auxiliary information is the encoding type of the bitstream and the encoding type of the transcoded bitstream, whether to perform a complete encoding and decoding or partial encoding and decoding is determined (that is, whether the encoding type of the bitstream is consistent with the encoding type of the transcoded bitstream is determined). If the partial encoding and decoding is performed (that is, the encoding type of the bitstream is consistent with the encoding type of the transcoded bitstream), the bitstream is transcoded according to the encoding information of the bitstream, and the transcoded bitstream is generated.

When the auxiliary information is the encoding capability level of the bitstream, a target encoding capability level that may be supported by the encoding capability level of the bitstream is acquired. If an encoding capability level requested by the receiving end is not greater than the target encoding capability level, the transcoding operation is performed on the bitstream, and the transcoded bitstream is generated. When the auxiliary information is the encoding capability level of the bitstream and the encoding capability level of the transcoded bitstream, whether to perform the complete encoding and decoding or the partial encoding and decoding is determined, and subsequent steps are consistent with execution steps when the auxiliary information is the encoding type of the bitstream and the encoding type of the transcoded bitstream, which will not be repeated herein.

When the auxiliary information is the code rate of the bitstream, a target code rate that may be supported by the code rate of the bitstream is acquired. When the auxiliary information is the frame rate of the bitstream, a target frame rate that may be supported by the frame rate of the bitstream is acquired. When the auxiliary information is the image resolution of the bitstream, a target image resolution that may be supported by the image resolution of the bitstream is acquired. When the auxiliary information is the color space of the bitstream, a target color space that may be supported by the color space of the bitstream is acquired. When the auxiliary information is the chrominance sampling format of the bitstream, a target chrominance sampling format that may be supported by the chrominance sampling format of the bitstream is acquired. When the auxiliary information is the chromaticity dynamic range of the bitstream, a target chromaticity dynamic range that may be supported by the chromaticity dynamic range of the bitstream is acquired. Subsequent steps are consistent with execution steps when the auxiliary information is the encoding type of the bitstream, which will not be repeated herein.

When the auxiliary information is the code rate of the bitstream and the code rate of the transcoded bitstream, when the auxiliary information is the frame rate of the bitstream and the frame rate of the transcoded bitstream, or when the auxiliary information is the image resolution of the bitstream and the image resolution of the transcoded bitstream, or when the auxiliary information is the color space of the bitstream and the color space of the transcoded bitstream, or when the auxiliary information is the chrominance sampling format of the bitstream and the chrominance sampling format of the transcoded bitstream, or when the auxiliary information is the chromaticity dynamic range of the bitstream and the chromaticity dynamic range of the transcoded bitstream, it is determined whether to perform the complete encoding and decoding or the partial encoding and decoding, and the subsequent steps are consistent with the execution steps when the auxiliary information is the encoding type of the bitstream and the encoding type of the transcoded bitstream, which will not be repeated herein.

When the auxiliary information is the encoding information of the bitstream, for example, the above-mentioned encoding information may be directly used in an encoding process of transcoding, the step of regenerating the above-mentioned encoding information is omitted, and the transcoded bitstream is generated. When the encoding information of the bitstream as the auxiliary information is information about the bitstream residual, the partial encoding and decoding is performed. The information about the bitstream residual is directly used in the encoding process, the encoding information of the bitstream is added, the steps of regenerating a residual and the above-mentioned encoding information are omitted, and the transcoded bitstream is generated. When the auxiliary information is at least one of the user-defined information of the bitstream or the user-defined information of the transcoded bitstream, the transcoding operation is assisted by the auxiliary information according to specific user-defined information.

The following descriptions are how to transcode the bitstream by using the auxiliary information and generate the transcoded bitstream based on embodiments in several application scenarios.

Embodiment One

In this embodiment, it is assumed that the auxiliary information is the encoding type of the bitstream (the encoding type of the bitstream is H.265/HEVC) and the encoding type of the transcoded bitstream (the encoding type of the transcoded bitstream is H.265/HEVC), the encoding type of the bitstream is the same as the encoding type of the transcoded bitstream. Therefore, a complete encoding and decoding may be performed or a partial encoding and decoding may also be performed.

In one embodiment, the auxiliary information further includes the encoding information of the bitstream, so after the decoded bitstream generates a reconstructed image, operations such as a mode selection and a motion estimation are not performed during encoding of the transcoding, and the encoding information of the bitstream is directly used for the encoding.

In one embodiment, the auxiliary information further includes the residual for the transcoded bitstream, or a difference value between the residual for the bitstream and the residual for the transcoded bitstream, so decoding in the transcoding only needs the bitstream residual and no reconstruction operation is needed. In the encoding process of the transcoding, the bitstream residual and the residual for the transcoded bitstream are directly added to generate a transcoded residual, then the transcoded residual combined with the encoding information of the bitstream is encoded to generate a new bitstream without the operations such as the mode selection and the motion estimation.

Embodiment Two

In this embodiment, it is assumed that the auxiliary information is the encoding type of the bitstream (the encoding type of the bitstream is H.265/HEVC) and the encoding type of the transcoded bitstream (the encoding type of the transcoded bitstream is H.264/AVC), the encoding type of the bitstream is different from the encoding type of the transcoded bitstream. If no available encoding information for H.264/AVC is parsed from the auxiliary information, a complete encoding and decoding is performed. If available encoding information for H.264/AVC is parsed from the auxiliary information, a partial encoding and decoding may be performed.

In one embodiment, the auxiliary information further includes the encoding information of the bitstream, meanwhile, the encoding information is available information of the transcoded bitstream with the encoding type of H.264/AVC. Therefore, after the decoded bitstream generates a reconstructed image, the operations such as the mode selection and the motion estimation are not required during re-encoding, and the encoding information of the bitstream is directly used for the encoding.

In one embodiment, the auxiliary information further includes the residual for the transcoded bitstream, or the difference value between the residual for the bitstream and the residual for the transcoded bitstream, so decoding in the transcoding only needs the bitstream residual and no reconstruction operation is needed. In the encoding process of the transcoding, the bitstream residual and the residual for the transcoded bitstream are directly added to generate the transcoded residual, then the transcoded residual combined with the encoding information of the bitstream is encoded to generate a new bitstream without the operations such as the mode selection and the motion estimation.

Embodiment Three

In this embodiment, it is assumed that the auxiliary information is the color space of the bitstream (the color space of the bitstream is the YUV) and the color space of the transcoded bitstream (the color space of the transcoded bitstream is the RGB), so a color space of a reconstructed image of the bitstream is converted from the YUV to the RGB during transcoding, and then an encoding operation is performed.

In one embodiment, the auxiliary information further includes the encoding information of the bitstream. When the encoding information may be used by the transcoded bitstream for transcoding, the operations such as the mode selection and the motion estimation are not required in an encoding process of the transcoding, and the encoding information of the bitstream is directly used for the encoding.

Embodiment Four

In this embodiment, it is assumed that the auxiliary information is the dynamic range of the bitstream (the dynamic range of the bitstream is the SDR) and the dynamic range of the transcoded bitstream (the dynamic range of the transcoded bitstream is the HDR), so a dynamic range of a reconstructed image of the bitstream is converted from the SDR to the HDR during transcoding, and then an encoding operation is performed. In one embodiment, the auxiliary information may carry a mapping table between the standard dynamic range and the high-dynamic range, or may carry information indicating a mapping mode.

In one embodiment, the auxiliary information further includes the encoding information of the bitstream. When the encoding information may be used by the transcoded bitstream for transcoding, the operations such as the mode selection and the motion estimation are not required in an encoding process of the transcoding, and the encoding information of the bitstream is directly used for the encoding.

Embodiment Five

In this embodiment, it is assumed that the auxiliary information is the resolution of the bitstream (the resolution of the bitstream is 1080p) and the resolution of the transcoded bitstream (the resolution of the transcoded bitstream is 720p), so a reconstructed image of the bitstream is down-sampled from 1080p to 720p in the transcoding, and then an encoding operation is performed. In one embodiment, the auxiliary information may carry a down-sampling filter table or may also carry information for indicating a filtering mode.

In one embodiment, the auxiliary information includes the encoding information of the bitstream. When the encoding information may be used by the transcoded bitstream for transcoding, the operations such as the mode selection and the motion estimation are not required in an encoding process of the transcoding, and the encoding information of the bitstream is directly used for the encoding.

In one embodiment, the auxiliary information includes the residual for the transcoded bitstream, or a difference value between a down-sampled residual for the bitstream and the residual for the transcoded bitstream, so decoding in the transcoding only needs the bitstream residual, no reconstruction operation is performed, after the residual for the bitstream is down-sampled, the down-sampled value of the residual for the bitstream and the residual for the transcoded bitstream are directly added in the encoding process of the transcoding, so the transcoded residual is generated, then the transcoded residual combined with the encoding information of the bitstream is encoded to generate a new bitstream without the operations such as the mode selection and the motion estimation.

In the bitstream processing method provided by the embodiments of the present disclosure, since the auxiliary information including at least one of the bitstream information for transcoding or the bitstream information for supporting transcoding in the bitstream is acquired, whether the auxiliary information is the bitstream information for transcoding or the bitstream information for supporting transcoding can provide help for a transcoding operation, therefore improving the transcoding efficiency.

In one embodiment, after the bitstream is transcoded by using the auxiliary information and the transcoded bitstream is generated, the method further includes steps described below.

New auxiliary information is generated according to the generated transcoded bitstream.

The generated new auxiliary information is added into the generated transcoded bitstream.

In one embodiment, the method further includes a step of adding flag bit information to the generated transcoded bitstream, where the flag bit information is used for representing that the transcoded bitstream has been transcoded.

In one embodiment, after the generated new auxiliary information is added to the generated transcoded bitstream, the method further includes a step described below.

The flag bit information is added into the generated transcoded bitstream, where the flag bit information is used for representing that the transcoded bitstream has been transcoded.

In one embodiment, the auxiliary information is located in a data unit carrying a preset identification, and the data unit includes an auxiliary information unit for transmitting the bitstream, a system layer media description unit and a media description unit contained in a media file format.

In one embodiment, when the data unit is the auxiliary information unit for transmitting the bitstream and the auxiliary information unit for transmitting the bitstream is a supplemental enhancement information (SEI) unit, the auxiliary information is located at a position where a payload type field in the SEI unit is the preset identification; and the step in which the auxiliary information in the bitstream is acquired includes steps described below.

The bitstream is parsed to acquire the SEI unit, and the auxiliary information is acquired at the position where the payload type field in the SEI unit is the preset identification.

In one embodiment, in the SEI unit, the payload type field may be payloadType, and the preset identification may be TRANSCODING_INFO. payloadSize may be a payload length field. SEI_payload( ) may be the payload of the SEI unit. A structure of TRANSCODING_INFO may be shown as table 1.

TABLE ONE

| | Descriptor |
|---|---|
| SEI_payload(payloadType, payloadSize) { | |
| ...... | |
| if(payloadType = = TRANSCODING_INFO) { | |
| ...... | |
| transcoding_info(payloadSize); | |
| ...... | |
| } | |
| } | |

On the basis of table 1, a representation of the auxiliary information may be shown as table 2.

TABLE TWO

| | Descriptor |
|---|---|
| transcoding_info(payloadSize) { | |
| ...... | |
| codec_info; | ue(v) |
| bitrate_info; | ue(v) |
| ...... | |
| transcoding_codec_info; | ue(v) |
| transcoding_bitrate_info; | ue(v) |
| ...... | |
| } | |

As shown in table 2, codec_info refers to information about the encoding type of the bitstream, bitrate_info refers to information about the code rate of the bitstream, transcoding_codec_info refers to information about the encoding type of the transcoded bitstream, and transcoding_bitrate_info refers to information about the code rate of the transcoded bitstream.

In one embodiment, when the data unit is the auxiliary information unit for transmitting the bitstream and the auxiliary information unit for transmitting the bitstream is a video usability information (VUI) unit, the auxiliary information is located at a position where a transcoding information mark field in the VUI unit is a preset value; and the step in which the auxiliary information in the bitstream is acquired includes steps described below.

The bitstream is parsed to acquire the VUI unit, and the auxiliary information is acquired at the position where the transcoding information mark field in the VUI unit is the preset value.

In one embodiment, in the VUI unit, the transcoding information mark field may be transcoding_info_flag with a preset value of 1. A structure of transcoding_info_flag may be shown as table 3.

TABLE THREE

| | Descriptor |
|---|---|
| VUI_parameters( ) { | |
| ...... | |
| transcoding_info_flag | u(1) |
| if(transcoding_info_flag) { | |
| ...... | |
| codec_info; | ue(v) |
| bitrate_info; | ue(v) |
| ...... | |
| transcoding_codec_info; | ue(v) |
| transcoding_bitrate_info; | ue(v) |
| ...... | |
| } | |
| } | |

As shown in table 3, codec_info refers to the information about the encoding type of the bitstream, bitrate_info refers to the information about the code rate of the bitstream, transcoding_codec_info refers to the information about the encoding type of the transcoded bitstream, and transcoding_bitrate_info refers to the information about the code rate of the transcoded bitstream. VUI_parameters( ) may be a VUI unit parameter.

In one embodiment, the auxiliary information may further be acquired from the system layer media description unit, and an example of the auxiliary information is shown in the structure of table 3. For example, the system layer media description unit may be a descriptor of a transport stream, a data unit of a file format (for example, in a box format) and media description information of the transport stream, an information unit such as a media presentation description (MPD).

In one embodiment, the auxiliary information in the bitstream processing method provided by the embodiments of the present disclosure may include multiple groups of information for generating multiple transcoded bitstreams.

In one embodiment, the bitstream processing method provided by the embodiments of the present disclosure may further be applied to processing a stereo video. The bitstream is configured to be information about a left field of view in stereo video data, and carried auxiliary information is related to a right field of view. Therefore, if a receiving end requests the stereo video, the auxiliary information is used to assist in transcoding of a bitstream of the right field of view, then the bitstream of the right field of view is combined with a bitstream of the left field of view to form a stereo bitstream and the stereo bitstream is sent to the receiving end. If the receiving end requests a video of the right field of view, the auxiliary information is used to assist in the transcoding of the bitstream of the right field of view, and the bitstream of the right field of view is directly sent to the receiving end.

In one embodiment, the bitstream processing method provided by the embodiments of the present disclosure may further be applied to processing a video of interest. The bitstream is configured to be a panoramic video, and carried auxiliary information is related to a region of interest to a user. Therefore, if the receiving end requests a bitstream of the region of interest, the auxiliary information is used to assist in transcoding of the bitstream of the region of interest and then the bitstream of the region of interest is sent to the receiving end.

In one embodiment, the carried auxiliary information according to the bitstream processing method provided by the embodiment of the present disclosure may include multiple groups of bitstream information for transcoding or bitstream information for supporting transcoding, and different bitstream information for transcoding or bitstream information for supporting transcoding may be used according to different requests of the receiving end.

An embodiment of the present disclosure further provides a computer-readable storage medium configured to store a computer-executable instruction for implementing the method of any one of the above-mentioned embodiments.

The storage medium is any one or more of various types of memory apparatuses or storage apparatuses. The term "storage medium" aims at including: an installation medium; a read-only memory (ROM), such as a compact disc read-only memory (CD-ROM), a floppy disk or a magnetic tape device; a computer system memory or a random access memory such as a dynamic random access memory (DRAM), a double data rate random access memory (DDR RAM), a static random-access memory (SRAM), an extended data output random access memory (EDO RAM), a Rambus random access memory (Rambus RAM); and a non-volatile memory such as a flash memory or a magnetic medium (such as a hard disk or optical storage); and a register or other similar types of memory elements, and the like. The storage medium may further include other types of memories or combinations thereof.

Figure 2:
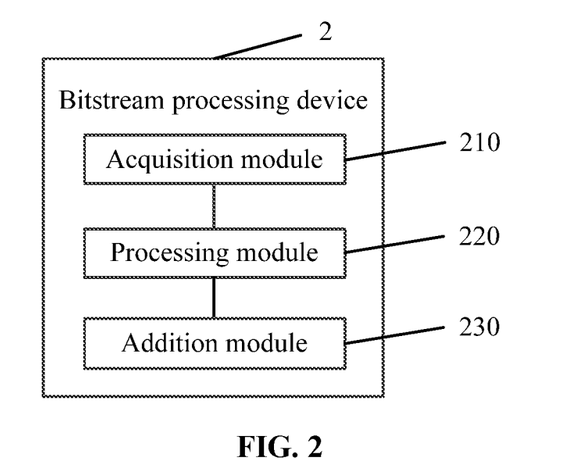
FIG. 2 is a structural diagram of a bitstream processing device according to an embodiment of the present disclosure.

An embodiment of the present disclosure provides a bitstream processing device. As shown in FIG. 2, the bitstream processing device 2 includes an acquisition module 210 and a processing module 220.

The acquisition module 210 is configured to acquire auxiliary information in a bitstream; where the auxiliary information includes at least one of bitstream information for transcoding or bitstream information for supporting transcoding.

The processing module 220 is configured to transcode the bitstream by using the auxiliary information and generate a transcoded bitstream.

In one embodiment, the acquisition module 210 may further be configured to generate new auxiliary information according to the generated transcoded bitstream.

The processing module 220 is further configured to add the generated new auxiliary information into the generated transcoded bitstream.

In one embodiment, the bitstream processing device 2 further includes an addition module 230 configured to add flag bit information to the generated transcoded bitstream, and the flag bit information is used for representing that the transcoded bitstream has been transcoded.

In one embodiment, the auxiliary information is located in a data unit carrying a preset identification, and the data unit includes an auxiliary information unit for transmitting the bitstream, a system layer media description unit and a media description unit contained in a media file format.

In one embodiment, the bitstream information for transcoding includes at least one of: an encoding type of the bitstream, an encoding capability level of the bitstream, a code rate of the bitstream, a frame rate of the bitstream, an image resolution of the bitstream, a color space of the bitstream, a luminance and chrominance sampling format of the bitstream, a dynamic range of the bitstream, encoding information of the bitstream or user-defined information of the bitstream.

The encoding information of the bitstream includes partitioning information of the bitstream, or the encoding information of the bitstream includes partitioning information of the bitstream, a bitstream residual and at least one of mode selection information of the bitstream, motion estimation information of the bitstream or quantization information of the bitstream. The bitstream residual includes a residual for the transcoded bitstream, or a difference value between a residual for the bitstream and a residual for the transcoded bitstream.

In one embodiment, the bitstream information for supporting transcoding includes at least one of: an encoding type of the transcoded bitstream, an encoding capability level of the transcoded bitstream, a code rate of the transcoded bitstream, a frame rate of the transcoded bitstream, an image resolution of the transcoded bitstream, a color space of the transcoded bitstream, a luminance and chrominance sampling format of the transcoded bitstream, a dynamic range of the transcoded bitstream or user-defined information of the transcoded bitstream.

In one embodiment, when the data unit is the auxiliary information unit for transmitting the bitstream and the auxiliary information unit for transmitting the bitstream is an SEI unit, the auxiliary information is located at a position where a payload type field in the SEI unit is the preset identification; and the acquisition module 210 is configured to:

parse the bitstream to acquire the SEI unit; and acquire the auxiliary information at the position where the payload type field in the SEI unit is the preset identification.

In one embodiment, when the data unit is the auxiliary information unit for transmitting the bitstream and the auxiliary information unit for transmitting the bitstream is a VUI unit, the auxiliary information is located at a position where a transcoding information mark field in the VUI unit is a preset value; and the acquisition module 210 is configured to:

parse the bitstream to acquire the VUI unit; and acquire the auxiliary information at the position where the transcoding information mark field in the VUI unit is the preset value.

In the bitstream processing device provided by the embodiments of the present disclosure, since the auxiliary information including at least one of the bitstream information for transcoding or the bitstream information for supporting transcoding in the bitstream is acquired, and whether the auxiliary information is the bitstream information for transcoding or the bitstream information for supporting transcoding can provide help for a transcoding operation, therefore improving the transcoding efficiency.

In the practical application, the acquisition module 210, the processing module 220 and the addition module 230 may be implemented by a central processing unit (CPU), a micro processor unit (MPU), a digital signal processor (DSP) or a field programmable gate array (FPGA) located in the bitstream processing device.

Figure 3:
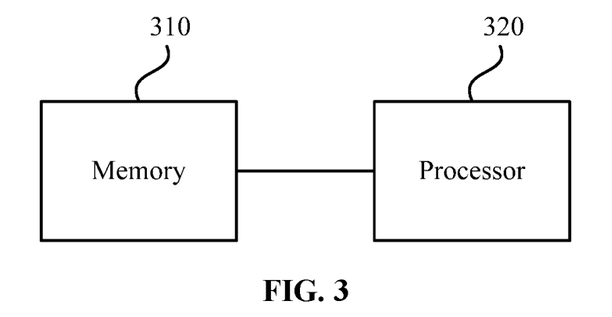
FIG. 3 is a structural diagram of another bitstream processing device according to an embodiment of the present disclosure.

An embodiment of the present disclosure further provides a device used for implementing the bitstream processing. As shown in FIG. 3, the device includes a memory 310 and a processor 320, where the memory 310 stores a following instruction executable by the processor 320.

Auxiliary information in a bitstream is acquired. The auxiliary information includes at least one of bitstream information for transcoding or bitstream information for supporting transcoding.

The bitstream is transcoded by using the auxiliary information and a transcoded bitstream is generated.

In one embodiment, the memory 310 further stores following instructions executable by the processor 320.

New auxiliary information is generated according to the generated transcoded bitstream.

The generated new auxiliary information is added to the generated transcoded bitstream.

In one embodiment, the memory 310 further stores following instructions executable by the processor 320.

Flag bit information is added into the generated transcoded bitstream, where the flag bit information is used for representing that the transcoded bitstream has been transcoded.

In one embodiment, the auxiliary information is located in a data unit carrying a preset identification, and the data unit includes an auxiliary information unit for transmitting the bitstream, a system layer media description unit and a media description unit contained in a media file format.

In one embodiment, the bitstream information for transcoding includes at least one of: an encoding type of the bitstream, an encoding capability level of the bitstream, a code rate of the bitstream, a frame rate of the bitstream, an image resolution of the bitstream, a color space of the bitstream, a luminance and chrominance sampling format of the bitstream, a dynamic range of the bitstream, encoding information of the bitstream or user-defined information of the bitstream. The encoding information of the bitstream includes partitioning information of the bitstream, or the encoding information of the bitstream includes partitioning information of the bitstream, a bitstream residual and at least one of mode selection information of the bitstream, motion estimation information of the bitstream or quantization information of the bitstream. The bitstream residual includes a residual for the transcoded bitstream, or a difference value between a residual for the bitstream and a residual for the transcoded bitstream.

In one embodiment, the bitstream information for supporting transcoding includes at least one of: an encoding type of the transcoded bitstream, an encoding capability level of the transcoded bitstream, a code rate of the transcoded bitstream, a frame rate of the transcoded bitstream, an image resolution of the transcoded bitstream, a color space of the transcoded bitstream, a luminance and chrominance sampling format of the transcoded bitstream, a dynamic range of the transcoded bitstream or user-defined information of the transcoded bitstream.

In one embodiment, when the data unit is the auxiliary information unit for transmitting the bitstream and the auxiliary information unit for transmitting the bitstream is an SEI unit, the auxiliary information is located at a position where an payload type field in the SEI unit is the preset identification; and the memory 310 stores the following instructions executable by the processor 320.

The bitstream is parsed to acquire the SEI unit.

The auxiliary information is acquired at the position where the payload type field in the SEI unit is the preset identification.

In one embodiment, when the data unit is a VUI unit in the auxiliary information unit for transmitting the bitstream, the auxiliary information is located at a position where a transcoding information mark field in the VUI unit is a preset value; and the memory 310 stores the following instructions executable by the processor 320.

The bitstream is parsed to acquire the VUI unit.

The auxiliary information is acquired at the position where the transcoding information mark field in the VUI unit is the preset value.

What is claimed is:

1. A bitstream processing method, comprising:
   acquiring auxiliary information in a bitstream; wherein the auxiliary information comprises at least one of bitstream information for transcoding or bitstream information for supporting transcoding; and
   transcoding the bitstream by using the auxiliary information, and generating a transcoded bitstream;
   wherein the bitstream information for transcoding comprises: an encoding type of the bitstream; the bitstream information for supporting transcoding comprises an encoding type of the transcoded bitstream;
   wherein transcoding the bitstream by using the auxiliary information, and generating the transcoded bitstream comprises:
   when the auxiliary information comprises the encoding type of the bitstream, acquiring a target encoding type that is supported by the encoding type of the bitstream; in response to an encoding type requested by a receiving end being the same as the encoding type of the bitstream or being contained in the target encoding type, performing a transcoding operation on the bitstream and generating the transcoded bitstream;
   when the auxiliary information comprises the encoding type of the bitstream and the encoding type of the transcoded bitstream, determining whether the encoding type of the bitstream is consistent with the encoding type of the transcoded bitstream; in response to the encoding type of the bitstream being consistent with the encoding type of the transcoded bitstream, performing transcoding operation on the bitstream according to the encoding information of the bitstream and generating the transcoded bitstream.

2. The method of claim 1, wherein after transcoding the bitstream by using the auxiliary information, and generating the transcoded bitstream, the method further comprises:

generating new auxiliary information according to the generated transcoded bitstream; and
adding the generated new auxiliary information into the generated transcoded bitstream.

3. The method of claim 1, further comprising:
adding flag bit information to the generated transcoded bitstream, wherein the flag bit information is used for representing that the transcoded bitstream has been transcoded.

4. The method of claim 1, wherein the auxiliary information is located in a data unit carrying a preset identification, and the data unit comprises an auxiliary information unit for transmitting the bitstream, a system layer media description unit and a media description unit contained in a media file format.

5. The method of claim 4, wherein the bitstream information for transcoding further comprises at least one of: an encoding capability level of the bitstream, a code rate of the bitstream, a frame rate of the bitstream, an image resolution of the bitstream, a color space of the bitstream, a luminance and chrominance sampling format of the bitstream, a dynamic range of the bitstream, encoding information of the bitstream or user-defined information of the bitstream;
wherein the encoding information of the bitstream comprises partitioning information of the bitstream; or, the encoding information of the bitstream comprises partitioning information of the bitstream, a bitstream residual and at least one of mode selection information of the bitstream, motion estimation information of the bitstream or quantization information of the bitstream; and the bitstream residual comprises a residual for the transcoded bitstream, or a difference value between a residual for the bitstream and a residual for the transcoded bitstream.

6. The method of claim 4, wherein the bitstream information for supporting transcoding further comprises at least one of: an encoding capability level of the transcoded bitstream, a code rate of the transcoded bitstream, a frame rate of the transcoded bitstream, an image resolution of the transcoded bitstream, a color space of the transcoded bitstream, a luminance and chrominance sampling format of the transcoded bitstream, a dynamic range of the transcoded bitstream or user-defined information of the transcoded bitstream.

7. The method of claim 5, wherein in a case where the data unit is the auxiliary information unit for transmitting the bitstream and the auxiliary information unit for transmitting the bitstream is a supplemental enhancement information (SEI) unit, the auxiliary information is located at a position where a payload type field in the SEI unit is the preset identification; and acquiring the auxiliary information in the bitstream comprises:
parsing the bitstream to acquire the SEI unit; and
acquiring the auxiliary information at the position where the payload type field in the SEI unit is the preset identification.

8. The method of claim 5, wherein in a case where the data unit is the auxiliary information unit for transmitting the bitstream and the auxiliary information unit for transmitting the bitstream is a video usability information (VUI) unit, the auxiliary information is located at a position where a transcoding information mark field in the VUI unit is a preset value; and acquiring the auxiliary information in the bitstream comprises:
parsing the bitstream to acquire the VUI unit; and
acquiring the auxiliary information at the position where the transcoding information mark field in the VUI unit is the preset value.

9. A bitstream processing device, comprising:
an acquisition module, configured to acquire auxiliary information in a bitstream; wherein the auxiliary information comprises at least one of bitstream information for transcoding or bitstream information for supporting transcoding; and
a processing module, configured to transcode the bitstream by using the auxiliary information and generate a transcoded bitstream;
wherein the bitstream information for transcoding comprises: an encoding type of the bitstream; wherein the bitstream information for supporting transcoding comprises an encoding type of the transcoded bitstream;
wherein the processing module is configured to transcode the bitstream by using the auxiliary information and generate the transcoded bitstream in the following manner:
when the auxiliary information comprises the encoding type of the bitstream, acquiring a target encoding type that is supported by the encoding type of the bitstream; in response to an encoding type requested by a receiving end being the same as the encoding type of the bitstream or being contained in the target encoding type, performing a transcoding operation on the bitstream and generating the transcoded bitstream;
when the auxiliary information comprises the encoding type of the bitstream and the encoding type of the transcoded bitstream, determining whether the encoding type of the bitstream is consistent with the encoding type of the transcoded bitstream; in response to the encoding type of the bitstream being consistent with the encoding type of the transcoded bitstream, performing transcoding operation on the bitstream according to the encoding information of the bitstream and generating the transcoded bitstream.

10. The device of claim 9, wherein the acquisition module is further configured to:
generate new auxiliary information according to the generated transcoded bitstream; and
the processing module is further configured to:
add the generated new auxiliary information into the generated transcoded bitstream.

11. The device of claim 9, further comprising:
an addition module, configured to add flag bit information into the generated transcoded bitstream, wherein the flag bit information is used for representing that the transcoded bitstream has been transcoded.

12. The device of claim 9, wherein the auxiliary information is located in a data unit carrying a preset identification, and the data unit comprises an auxiliary information unit for transmitting the bitstream, a system layer media description unit and a media description unit contained in a media file format.

13. The device of claim 12, wherein the bitstream information for transcoding further comprises at least one of: an encoding capability level of the bitstream, a code rate of the bitstream, a frame rate of the bitstream, an image resolution of the bitstream, a color space of the bitstream, a luminance and chrominance sampling format of the bitstream, a dynamic range of the bitstream, encoding information of the bitstream or user-defined information of the bitstream;
wherein the encoding information of the bitstream comprises partitioning information of the bitstream; or the encoding information of the bitstream comprises partitioning information of the bitstream, a bitstream residual and at least one of mode selection information of the bitstream, motion estimation information of the bitstream or quantization information of the bitstream; and the bitstream residual comprises a residual for the transcoded bitstream, or a difference value between a residual for the bitstream and a residual for the transcoded bitstream.

14. The device of claim 12, wherein the bitstream information for supporting transcoding further comprises at least one of: an encoding capability level of the transcoded bitstream, a code rate of the transcoded bitstream, a frame rate of the transcoded bitstream, an image resolution of the transcoded bitstream, a color space of the transcoded bitstream, a luminance and chrominance sampling format of the transcoded bitstream, a dynamic range of the transcoded bitstream or user-defined information of the transcoded bitstream.

15. The device of claim 13, wherein in a case where the data unit is the auxiliary information unit for transmitting the bitstream and the auxiliary information unit for transmitting the bitstream is a supplemental enhancement information (SEI) unit, the auxiliary information is located at a position where a payload type field in the SEI unit is the preset identification; and the acquisition module is configured to:
  parse the bitstream to acquire the SEI unit; and
  acquire the auxiliary information at the position where the payload type field in the SEI unit is the preset identification.

16. The device of claim 13, wherein in a case where the data unit is the auxiliary information unit for transmitting the bitstream and the auxiliary information unit for transmitting the bitstream is a video usability information (VUI) unit, the auxiliary information is located at a position where a transcoding information mark field in the VUI unit is a preset value; and the acquisition module is configured to:
  parse the bitstream to acquire the VUI unit; and
  acquire the auxiliary information at the position where the transcoding information mark field in the VUI unit is the preset value.

17. A bitstream processing device, comprising a memory and a processor, wherein the memory is configured to store an instruction which, when executed by the processor, implements the method of claim 1.

18. A non-transitory computer-readable storage medium, configured to store a computer-executable instruction which, when executed, implements the method of claim 1.

19. The method of claim 2, further comprising:
  adding flag bit information to the generated transcoded bitstream, wherein the flag bit information is used for representing that the transcoded bitstream has been transcoded.

20. The method of claim 2, wherein the auxiliary information is located in a data unit carrying a preset identification, and the data unit comprises an auxiliary information unit for transmitting the bitstream, a system layer media description unit and a media description unit contained in a media file format.

* * * * *